United States Patent [19]

Henry et al.

[11] Patent Number: 5,660,040
[45] Date of Patent: Aug. 26, 1997

[54] SCRAMJET FUEL INJECTION SYSTEM HAVING INDEPENDENT FUEL SUPPLIES FOR SUPERSONIC AND HYPERSONIC OPERATION

[75] Inventors: Clifton Lee Henry, Hobe Sound; John Eric Delametter, Jupiter, both of Fla.

[73] Assignee: United Technologies Corporation, Hartford, Conn.

[21] Appl. No.: 359,808

[22] Filed: Dec. 20, 1994

[51] Int. Cl.[6] .................................................. F02K 7/08
[52] U.S. Cl. ........................ 60/270.1; 60/204; 60/243
[58] Field of Search ............................. 60/204, 233, 243, 60/270.1, 267

[56] References Cited

U.S. PATENT DOCUMENTS

| | | | |
|---|---|---|---|
| 2,968,147 | 1/1961 | Truly, Jr. et al. | 60/270.1 |
| 3,279,194 | 10/1966 | Chapman | 60/270.1 |
| 3,280,565 | 10/1966 | Dugger et al. | 60/270 |
| 3,363,421 | 1/1968 | Ferri | 60/263 |
| 3,974,648 | 8/1976 | Kepler | 60/270 R |
| 4,722,181 | 2/1988 | Yu | 60/737 |
| 4,821,512 | 4/1989 | Guile et al. | 60/736 |
| 4,903,480 | 2/1990 | Lee et al. | 60/740 |
| 5,012,638 | 5/1991 | Grieb et al. | 60/270.1 |
| 5,072,581 | 12/1991 | Harshman | 60/740 |
| 5,214,914 | 6/1993 | Billig et al. | 60/270.1 |
| 5,220,787 | 6/1993 | Bulman | 60/270.1 |
| 5,253,474 | 10/1993 | Correa et al. | 60/740 |
| 5,280,705 | 1/1994 | Epstein et al. | 60/270.1 |

FOREIGN PATENT DOCUMENTS

| | | | |
|---|---|---|---|
| 123069 | 5/1931 | Germany. | |
| 55-92621 | 6/1982 | Japan. | |
| 55-92622 | 6/1982 | Japan. | |
| 115559 | 4/1990 | Japan | 60/270.1 |

*Primary Examiner*—Timothy Thorpe
*Assistant Examiner*—Ted Kim

[57] ABSTRACT

A fuel injector for a scramjet engine includes independently manifolded normal (48, 54) and axial fuel injection (56). Various construction details are developed that provide effective performance of the fuel injector over a range of speed and combustor conditions. In a particular embodiment the fuel injector has a wedge shape with a swept leading edge. The fuel injector includes a pair of sidewalls, a top surface, a downstream facing surface, and a plurality of apertures in the sidewalls, top surface and downstream facing surface. At speeds less than hypersonic (normal injection), fuel is injected into the combustor from the apertures in the sidewalls (48) and top surface (54). At hypersonic speeds (axial injection), fuel is injected through the apertures in the downstream facing surface (56).

6 Claims, 2 Drawing Sheets

SCRAMJET FUEL INJECTION SYSTEM HAVING INDEPENDENT FUEL SUPPLIES FOR SUPERSONIC AND HYPERSONIC OPERATION

The Government has rights in this invention, pursuant to a Contract awarded by the Department of the Air Force.

TECHNICAL FIELD

The present invention relates to scramjet engines, and more particularly to fuel injection systems for combustors of such engines.

BACKGROUND OF THE INVENTION

A supersonic combustion ramjet engine, referred to as a 'scramjet', is a potential propulsion system for flight vehicles traveling at hypersonic speeds. Hypersonic typically refers to speeds greater than Mach 4. A typical scramjet is comprised of a passage, some form of fuel injector, and an exhaust nozzle. The motion of the aircraft directs the fluid into the passage where it is compressed. Fuel is injected into the compressed fluid and burned. The products of combustion are then ejected through the exhaust nozzle to provide forward thrust to the aircraft. An advantage of this means of propulsion is its simplicity.

Various types of fuel injectors have been proposed. In the first type, fuel is injected normal to the direction of flow. The normal injection improves mixing and thereby fuel burning efficiency. Drawbacks to this type of injection include transmission of a pressure rise upstream of the combustion that may interfere with the flow through the combustion region and reduced mixing effectiveness at hypersonic speeds.

Another type of fuel injection comprises injecting fuel in the direction of flow through the combustor. The advantage to this type of fuel injection is that the momentum of the fuel injected into the fluid stream contributes to the thrust created by the engine. This feature is especially significant at hypersonic speeds. At speeds less than hypersonic, however, axial injection may lead to poor mixing.

U.S. Pat. No. 5,253,474, issued to Correa et al and titled "Apparatus for Supersonic Combustion in a Restricted Length", discloses a combustor having axial fuel injection and normal fuel injection downstream of a backward facing step. According to Correa, the backward facing step avoids coupling between the inlet flow and the combustion process. Both the axial and normal fuel injection occur simultaneously in Correa throughout the speed range. This results in axial injection at speeds less than hypersonic and normal injection at hypersonic speeds, neither of which is ideal.

Heat loads on the structure is another issue related to the fuel injectors. The combination of the adjacent combustion process and the supersonic flow results in large heat loads on the fuel injectors. Cooling is required to prevent heat damage from occurring. Typically, the cooling comes from flowing the fuel through the injector before ejecting it into the flow path.

An example of such a cooling scheme is disclosed in U.S. Pat. No. 4,903,480, issued to Lee et al and rifled "Hypersonic scramjet Engine Fuel Injector". The fuel injector disclosed in Lee is a hollow wedge shaped housing having an interior serpentine fuel passageway. Fuel traveling through the passageway cools the injector. In this way cooling flow and fuel flow are linked, i.e. high fuel flow results in maximum cooling flow and low fuel flow results in lower cooling flow. In practice, however, heat loads and fuel flow may not be directly related. This would result in too little cooling under some conditions and excessive cooling flow, and its associated pressure drops within the fuel flow, at other conditions.

The above art notwithstanding, scientists and engineers under the direction of Applicants' Assignee are working to develop fuel injectors and fuel injection systems for scramjet engines capable of providing thrust efficiently at both hypersonic and less than hypersonic speeds.

SUMMARY OF THE INVENTION

According to the present invention, a fuel injector for a scramjet engine includes independently manifolded normal and axial fuel injection.

According to a specific embodiment of the present invention, the fuel injector has a swept leading edge forming a wedge shape facing oncoming flow, a pair of sidewalls extending from the leading edge, a top surface, a downstream facing surface, and a plurality of apertures in the sidewalls, top surface and downstream facing surface. Fuel from a first fuel supply means is ejected from the apertures in the sidewalls and top surface, and fuel from a second fuel supply means is ejected from the apertures in the downstream facing surface. According further, the fuel injector includes separately manifolded transpiration cooling of the leading edge and convective cooling of the sidewalls.

A principle feature of the present invention is the separately manifolded normal and axial fuel injection. The primary advantage of separate manifolding is, the performance of the fuel injector over the range of speeds. At supersonic speeds less than hypersonic, the normal fuel injection provides optimal mixing and fuel burn. At hypersonic speeds, the axial injection provides the needed momentum for thrust.

Another feature is the transpiration cooling which may also be separately manifolded. In this way maximum cooling flow can be provided during operations in which the injector is under maximum heat load.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
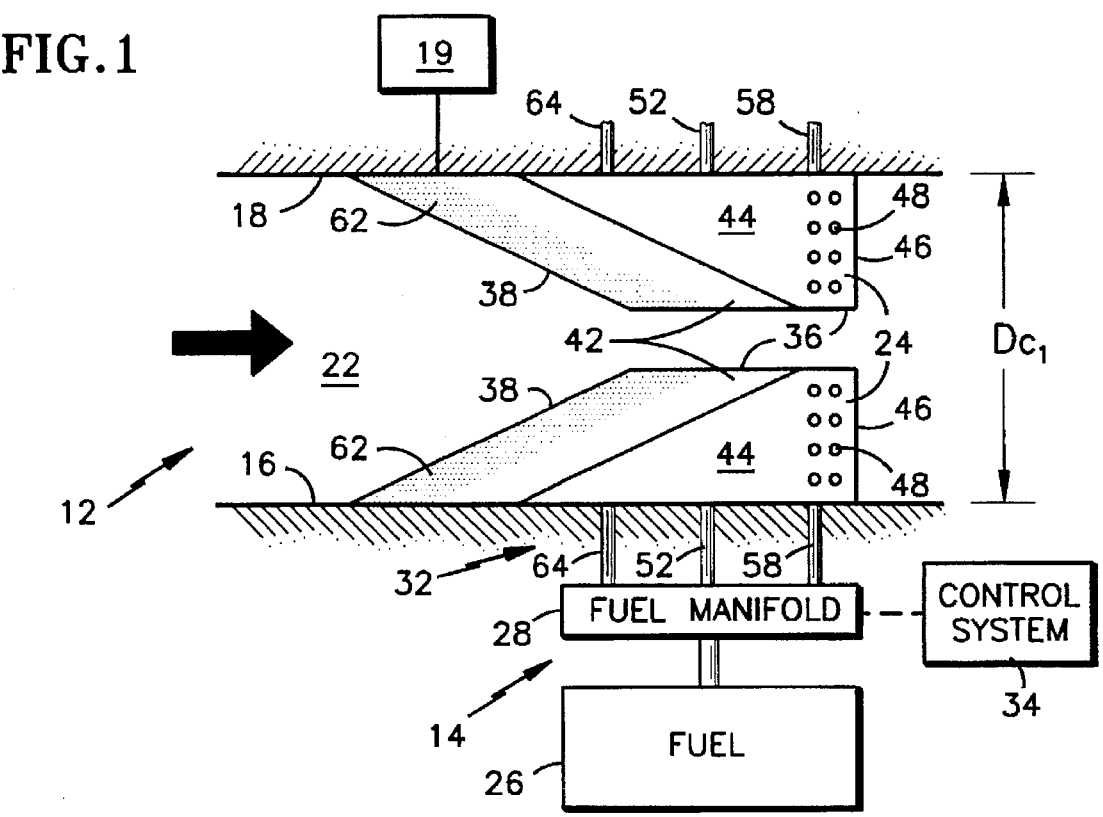
FIG. 1 is a side view of a portion of the scramjet combustor showing a pair of fuel injectors for the combustor.

FIG. 1 illustrate a scramjet combustor 12 having a fuel injection system 14 in accordance with the present invention. The combustor extends longitudinally and includes a first wall 16 and a second wall 18 that in conjunction define the flow passage 22 for the incoming air. The fuel injection system 14 includes a plurality of fuel injectors 24, a source of fuel 26, a fuel manifold 28 connected to the source of fuel 26, a plurality of fuel lines 32 connecting the manifold 28 and the plurality of fuel injectors 24, and a fuel control system 34. The manifold 28 controls the flow of fuel to the fuel injectors 24 in accordance with a fuel flow schedule controlled by the control system 34. The fuel lines 32 define means to independently supply fuel to the injection sites 48, 56, and 54.

Figure 2:
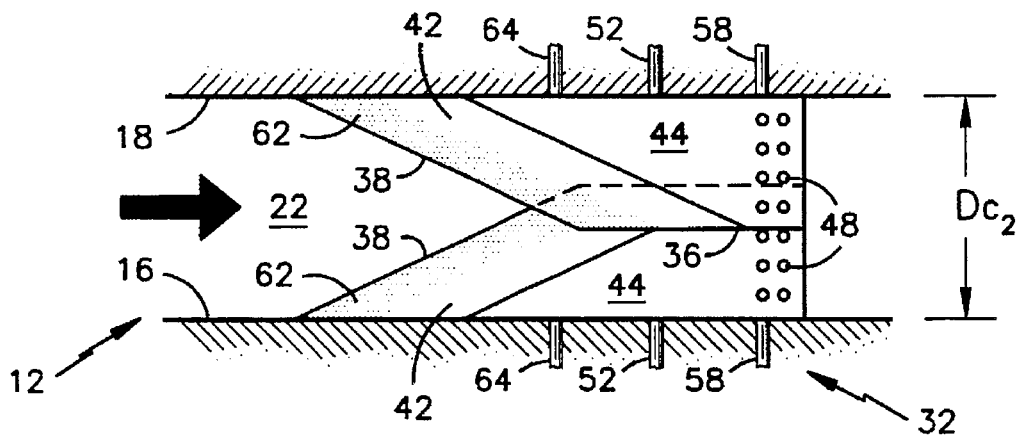
FIG. 2 is a side view of the scramjet combustor operating in a hypersonic condition.

As illustrated in FIG. 1, the combustor 12 is operating in a flow condition wherein the flow through the combustor 12 is less than hypersonic ($1<M_c<4$) where $M_c$=Combustor Entrance Mach Number. At operating conditions corresponding to hypersonic flow speed ($M_c>4$), the combustor 12 is as illustrated in FIG. 2. As can be seen from a comparison of FIGS. 1 and 2, at flow speeds less than hypersonic the first wall 16 and the second wall 18 are separated by a distance $Dc_1$, and at hypersonic flow speeds the first and second walls 16, 18 are separated by a distance $Dc_2$, with $Dc_1>Dc_2$. In effect, the walls 16, 18 converge as the flight speed increases through the supersonic and into the hypersonic range. Operators means 19 functions to change the seperation distance of the first and second walls.

Figure 5:
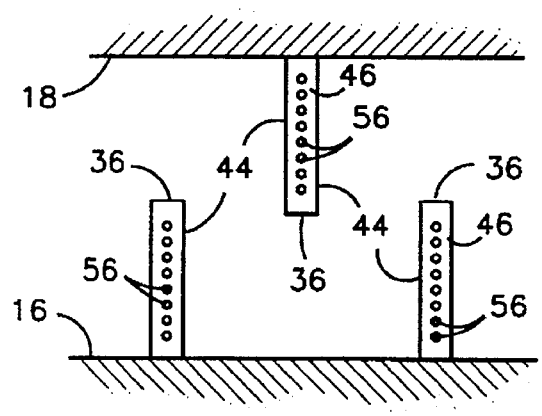
FIG. 5 is an end view, looking upstream, of the scramjet combustor showing a plurality of axial fuel injection ports.

As a result, the fuel injectors 24 also converge and, in fact, overlap as shown in FIG. 5. The individual fuel injectors 24 are disposed on one of the walls and extend through the flow passage 22 and toward the opposite wall. The plurality of fuel injectors 24 are staggered and the staggered arrangement permits the walls 16,18 to converge and the top surface 36 of each of the fuel injectors 24 to move through the centerline of the flow passage 22 without interfering with the top surface 36 of an adjacent fuel injector 24.

Figure 3:
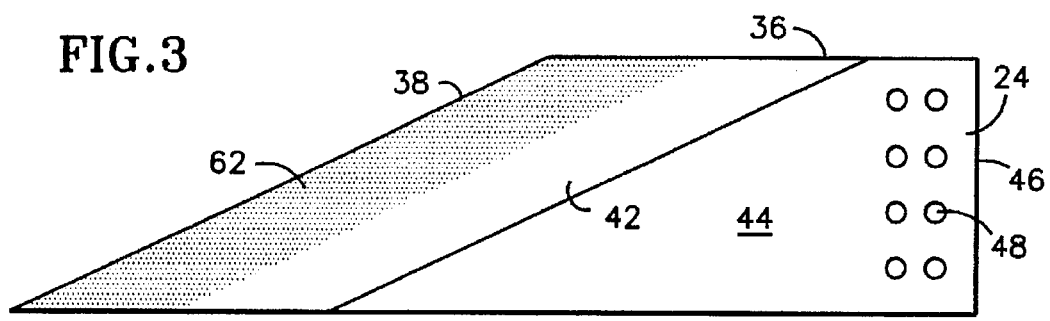
FIG. 3 is a side view of one of the individual fuel injectors.
Figure 4:
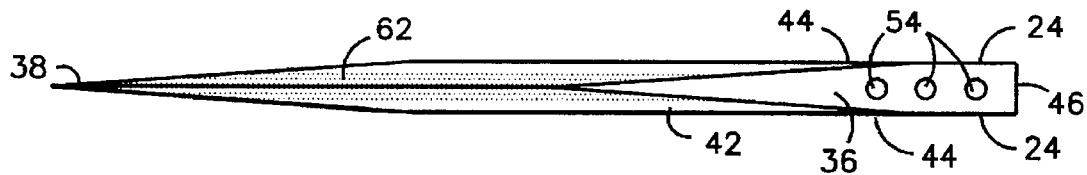
FIG. 4 is a top view of one of the fuel injectors.

Each fuel injector 24, as shown in FIGS. 3 to 5, has a swept leading edge 38, canted forward surfaces 42, two sidewalls 44 extending longitudinally from the forward surfaces 42, the top surface 36 facing the opposite wall, and a downstream facing or axial surface 46. The swept leading edge 38 reduces the heat load on the fuel injector 24. The canted forward facing surfaces 42 extend from the leading edge 38 and transition the leading edge 38 into the sidewalls 44 and top surface 36 to form a wedge shape structure.

The fuel injector 24 includes three groups of apertures or ports for injecting fuel into the air stream. The first group 48 are disposed in the sidewalls 44, one set of apertures on each side, and inject fuel laterally from the fuel injector 24 and normal to the direction of flow through the passage 22. The first group 48 is connected to the manifold 28 via the first fuel line 52.

The second group 54 of apertures is located in the top surface 36 (see FIG. 4) and injects fuel toward the opposite wall and, as with the first group 48 of apertures, normal to the direction of flow through the passage 22. The second group 54 is connected to the manifold 28 via the first fuel line 52.

The third group 56 of apertures is located in the downstream facing surface 46 (see FIG. 5). This group 56 of apertures injects fuel into the flow passage 22 in the direction of flow, i.e. axial fuel injection. The third group 56 of apertures is connected to the manifold 28 through the second fuel line 58.

The fuel injector 24 includes a transpiration cooling system 62 for cooling the leading edge 38 and the forward most surfaces of the forward facing surfaces 42. The cooling fluid for the transpiration cooling system 62 is fuel which is diverted from the fuel injection apertures. After removing heat from the leading edge 38 and the forward facing surfaces 42, the fuel flows into the flow passage 22 of the combustor 12 and is burned.

During operation the manifold 28 flows varying ratios of fuel to the three groups of apertures 48, 54, 56. At supersonic combustor Mach numbers (less than hypersonic), the combustor 12 is in a condition as illustrated in FIG. 1 and fuel flows primarily to the first 48 and second 54 groups of apertures. This type of injection, being normal to the direction of flow through the combustor 12, provides optimum mixing of fuel in the combustor 12 for non-hypersonic speeds. In addition, since the walls 16, 18 and injectors 24 are at their maximum separation Dc, sidewall 44 and top surface 36 injection provides a good distribution of the fuel within the passage 22.

At hypersonic flow speeds, however, the walls 16, 18 and injectors 24 converge as discussed previously. The manifold 28 then switches the fuel flow to primarily axial injection from the third group of apertures 56. This type of injection provides adequate mixing through shear mixing and takes advantage of the momentum added by the axial injection of fuel in the direction of flow.

As a result of having both normal and axial injection, and having the fuel flow to the different types of injection being independent of each other, the operation of the fuel injection system 14 may be optimized for a wide range of Combustor entrance conditions. In addition, if further tailoring of the fuel injection is necessitated by the particular inlet design, the normal injection may be further controlled by separately manifolding the fuel flow to the sidewall apertures 48 and to the tip surface apertures 54.

In addition, the fuel flow to the transpiration cooling system 62 may also be manifolded to provide maximum fuel flow at those flow conditions at which it is needed. The transpiration cooling system 62 may be supplied by a third fuel line 64 extending from the manifold 28. This configuration provides a more efficient use of fuel than that disclosed in the prior art.

Although the invention has been shown and described with respect to exemplary embodiments thereof, it should be understood by those skilled in the art that various changes, omissions, and additions may be made thereto, without departing from the spirit and scope of the invention.

We claim:

1. A fuel injector for a scramjet engine, the scramjet engine including a longitudinally extending combustor having a pair of opposing combustor walls, the pair of combustor walls defining a flow path for supersonic flow therethrough, the fuel injector disposed on one of the pair of combustor walls and extending towards the other of the pair of combustor walls, the fuel injector having a swept leading edge, being shaped such that a pair of forward facing surfaces present a wedge shape to oncoming flow within the flow path, and including a sidewall extending longitudinally from each of the forward facing surfaces, a top surface facing the other of the pair of combustor walls, and a downstream facing surface, each of the pair of sidewalls including a plurality of apertures for injecting fuel laterally from the fuel injector and normal to the direction of supersonic flow within the flow path, the top surface including a plurality of apertures for injecting fuel towards the other of the pair of combustor walls and normal to the direction of supersonic flow within the flow path, and the downstream facing surface including a plurality of apertures for injecting fuel in the direction of supersonic flow, the plurality of apertures of the side walls and top surface being in fluid communication with a first fuel supply means, the plurality of apertures of the downstream facing surface being in fluid communication with a second fuel supply means, such that the quantity of fuel supplied to the sidewall and top surface apertures is independent of the quantity of fuel supplied to the downstream facing surface apertures.

2. A fuel injector for a scramjet engine, the scramjet engine including a longitudinally extending combustor having a pair of opposing combustor walls, the pair of combustor walls defining a flow path for supersonic flow therethrough, the fuel injector disposed on one of the pair of combustor walls and extending towards the other of the pair of combustor walls, the fuel injector having a swept leading edge, being shaped such that a pair of forward facing surfaces present a wedge shape to oncoming flow within the flow path, and including a sidewall extending longitudinally from each of the forward facing surfaces, a top surface facing the other of the pair of combustor walls, and a downstream facing surface, each of the pair of sidewalls including a plurality of apertures for injecting fuel laterally from the fuel injector and normal to the direction of supersonic flow within the flow path, the top surface including a plurality of apertures for injecting fuel towards the other of the pair of combustor walls and normal to the direction of supersonic flow within the flow path, and the downstream facing surface including a plurality of apertures for injecting fuel in the direction of supersonic flow, the plurality of apertures of the side walls and top surface being in fluid communication with a first fuel supply means, the plurality of apertures of the downstream facing surface being in fluid communication with a second fuel supply means, such that the quantity of fuel supplied to the sidewall and top surface apertures is independent of the quantity of fuel supplied to the downstream facing surface apertures, and a cooling system, wherein the cooling system includes transpiration cooling of the leading edge and the forward facing surfaces, and wherein the cooling system is independent of both fuel supply means.

3. A fuel injection system for a scramjet engine, the scramjet engine including a longitudinally extending combustor having a pair of opposing combustor walls, the pair of combustor walls defining a flow path for supersonic flow therethrough, the fuel injection system including a plurality of fuel injectors, a first group of the plurality of fuel injectors disposed on the first of the pair of combustor walls and extending towards the other of the pair of combustor walls, a second group of fuel injectors disposed on the other of the pair of combustor walls and extending toward the first of the pair of combustor walls, the plurality of fuel injectors being laterally staggered such that adjacent fuel injectors on the first of the pair of combustor walls are disposed on opposite sides of one of the fuel injectors on the other of the pair of combustor walls, each of the fuel injectors having a swept leading edge, being shaped such that a pair of forward facing surfaces present a wedge shape to oncoming flow within the flow path; and including a sidewall extending longitudinally from each of the forward facing surfaces, a top surface facing the other of the pair of combustor walls, and a downstream facing surface, each of the pair of sidewalls including a plurality of apertures for injecting fuel laterally from the fuel injector and normal to the direction of supersonic flow within the flow path, the top surface including a plurality of apertures for injecting fuel towards the other of the pair of combustor walls and normal to the direction of supersonic flow within the flow path, and the downstream facing surface including a plurality of apertures for injecting fuel in the direction of supersonic flow, the plurality of apertures of the side walls and top surface being in fluid communication with a first fuel supply means, the plurality of apertures of the downstream facing surface being in fluid communication with a second fuel supply means, such that the quantity of fuel supplied to the sidewall and top surface apertures is independent of the quantity of fuel supplied to the downstream facing surface apertures.

4. The fuel injection system according to claim 3, wherein the combustor has a supersonic operating condition defined as having a combustion flow $1<M_c<4$ and a hypersonic operating condition defined as having a combustion flow $M_c>4$, wherein the combustor walls are separated by a distance Dc, means for moving the combustor walls such that Dc during supersonic operation is greater than Dc during hypersonic operation such that each of the fuel injectors is closer to the opposite wall during hypersonic operation, and wherein during supersonic operation fuel is primarily injected into the combustor through the downstream facing surface apertures.

5. The fuel injector system according to claim 3, further including a cooling system, wherein the cooling system includes transpiration cooling of the leading edge and the forward most surfaces of the forward facing surfaces, and wherein the cooling system is in fluid communication with the first fuel supply means.

6. A method to inject fuel into a combustor of a scramjet engine, the combustor being longitudinally extending and having a pair of opposing combustor walls, the pair of combustor walls defining a flow path for supersonic flow therethrough, the scramjet engine including a fuel injection system including a plurality of fuel injectors, a first group of the plurality of fuel injectors disposed on the first of the pair of combustor walls and extending towards the other of the pair of combustor walls, a second group of fuel injectors disposed on the other of the pair of combustor walls and extending toward the first of the pair of combustor walls, the plurality of fuel injectors being laterally staggered such that adjacent fuel injectors on the first of the pair of combustor walls are disposed on opposite sides of one of the fuel injectors on the other of the pair of combustor walls, each of the fuel injectors having a swept leading edge, being shaped such that a pair of forward facing surfaces present a wedge shape to oncoming flow within the flow path, and including a sidewall extending longitudinally from each of the forward facing surfaces, a top surface facing the other of the pair of combustor walls, and a downstream facing surface, each of the pair of sidewalls including a plurality of apertures for injecting fuel laterally from the fuel injector and normal to the direction of supersonic flow within the flow path, the top surface including a plurality of apertures for injecting fuel towards the other of the pair of combustor walls and normal to the direction of supersonic flow within the flow path, and the downstream facing surface including a plurality of apertures for injecting fuel in the direction of supersonic flow, the plurality of apertures of the side walls and top surface being in fluid communication with a first fuel supply means, the plurality of apertures of the downstream facing surface being in fluid communication with a second fuel supply means, such that the quantity of fuel supplied ot the sidewall and top surface apertures is independent of the quantity of fuel supplied to the downstream facing surface apertures, wherein the combustor has a supersonic operating condition defined as having a combustion flow $1<M_c<4$ and a hypersonic operating condition defined as having a combustion flow mach number $M_c>4$, the method including the steps of:

injecting substantially all the fuel through the side and top surface apertures during supersonic operation of the combustor; and injecting substantially all the fuel through the downstream facing surface apertures during hypersonic operation of the combustor.

* * * * *